(12) United States Patent
Mears

(10) Patent No.: US 12,381,838 B2
(45) Date of Patent: Aug. 5, 2025

(54) STATEFUL EMAIL DETECTION USING SCHEMALESS DATA FRAGMENTS

(71) Applicant: SOPHOS LIMITED, Abingdon (GB)

(72) Inventor: John Mears, Carmarthen (GB)

(73) Assignee: SOPHOS LIMITED, Abingdon (GB)

( * ) Notice: Subject to any disclaimer, the term of this patent is extended or adjusted under 35 U.S.C. 154(b) by 83 days.

(21) Appl. No.: 18/308,560

(22) Filed: Apr. 27, 2023

(65) Prior Publication Data
US 2024/0364651 A1    Oct. 31, 2024

(51) Int. Cl.
*H04L 51/212*    (2022.01)
*G06F 21/56*    (2013.01)

(52) U.S. Cl.
CPC .......... *H04L 51/212* (2022.05); *G06F 21/566* (2013.01)

(58) Field of Classification Search
CPC ....... H04L 51/212; H04L 67/02; H04L 63/08; H04L 41/0893; H04L 41/0894; H04L 63/145; H04L 41/0896; H04L 41/5029; H04L 63/20; H04L 43/08; H04L 47/19; H04L 47/83; H04L 63/0227; H04L 63/0428; H04L 63/10; H04L 12/14; H04L 41/5051; H04L 67/51; H04L 67/61; H04L 41/5022; H04L 47/20; H04L 47/2475; H04L 47/803; H04L 12/1492; H04L 12/1496; H04L 41/5006; H04L 41/5054; H04L 43/0882; H04L 47/12; H04L 47/2425; H04L 47/801; H04L 47/805; H04L 47/808; H04L 47/822; H04L 47/824; H04L 63/102; H04L 51/234; H04L 51/18; H04L 51/42; H04L 63/123; H04L 63/168; H04L 51/48; H04L 9/3247; H04L 63/126; H04L 9/50; H04L 9/3239; H04L 2209/56; H04L 63/0442; H04L 63/061; H04L 9/0894; H04L 9/40; H04L 63/101; H04L 63/14; H04L 63/0218; H04L 63/105; H04L 9/30; H04L 9/3268; H04L 9/3236; H04L 2209/76; H04L 63/02; H04L 63/0869; H04L 67/141; H04L 67/563;
(Continued)

(56) References Cited

U.S. PATENT DOCUMENTS 8,103,875 B1 * 1/2012 Ramzan .............. H04L 63/0236
713/180
8,682,964 B1 * 3/2014 Brundage ............... H04L 67/02
709/217

(Continued)

*Primary Examiner* — Djenane M Bayard
(74) *Attorney, Agent, or Firm* — IP Spring

(57) ABSTRACT

A computer-implemented method includes sending email scan requests to an email scanner. The method further includes receiving, from the email scanner, a verdict of suspicion and one or more data fragments. The method further includes storing the one or more data fragments for each email of the plurality of emails in a datastore. The method further includes receiving a new email. The method further includes deriving one or more new keys for the new email. The method further includes retrieving one or more matching data fragments from the datastore by matching the one or more new keys with the one or more keys stored in the datastore. The method further includes providing, to the email scanner, the new email and the one or more matching data fragments. The method further includes receiving a new verdict of suspicion and one or more new data fragments.

20 Claims, 5 Drawing Sheets

(58) Field of Classification Search
CPC ....... H04L 9/3273; H04L 9/0891; H04L 9/14; H04L 9/0897; H04L 9/0861; H04L 9/0822; H04L 9/088; H04L 63/0876; H04L 9/0866; H04L 63/06; H04L 63/083; H04L 9/0637; H04L 9/085; H04L 2209/34; H04L 61/4511; H04L 63/062; H04L 63/1441; H04L 9/3263; H04L 9/3265; H04L 9/3278; H04L 63/12; H04L 9/32; H04L 9/3297; H04L 2209/80; H04L 9/3255; H04L 67/10; H04L 9/083; H04L 2101/37; H04L 2101/654; H04L 63/1458; H04L 67/306; H04L 9/3073; H04L 9/3226; H04L 9/3242; H04L 2463/141; H04L 61/35; H04L 61/5007; H04L 63/0823; H04L 63/1408; H04L 63/1416; H04L 9/08; H04L 9/0825; H04L 9/0643; H04L 9/3234; H04L 67/1097; H04L 9/0819; H04L 9/3252; H04L 63/0853; H04L 67/535; H04L 9/3271; H04L 2209/84; H04L 2463/102; H04L 63/0435; H04L 63/1466; H04L 67/12; H04L 9/0869; H04L 2209/60; H04L 2209/805; H04L 43/0847; H04L 63/0281; H04L 63/04

See application file for complete search history.

(56) References Cited

U.S. PATENT DOCUMENTS

| | | | |
|---|---|---|---|
| 12,021,808 B2 * | 6/2024 | Fujiwara | H04L 51/48 |
| 2004/0054498 A1 * | 3/2004 | Shipp | G06Q 10/107 |
| | | | 702/182 |
| 2006/0168028 A1 * | 7/2006 | Duxbury | H04L 63/1466 |
| | | | 709/206 |
| 2007/0214220 A1 * | 9/2007 | Alsop | H04L 51/212 |
| | | | 709/206 |

* cited by examiner

```
{
    "fragment_data" : { . . . }
    "key" : "sender_address",
    "scanner" : "SASI",
    "name" : "inbound-sender-seen",
    "serial" : 12345
}
```

FIG 3

STATEFUL EMAIL DETECTION USING SCHEMALESS DATA FRAGMENTS

FIELD

Embodiments relate generally to determining whether an email is suspicious based on data fragments associated with previous emails. More particularly, embodiments relate to methods, systems, and computer readable media that store schemaless data fragments for previous emails and use the data fragments to determine whether the email is suspicious.

BACKGROUND

Emails scanners analyze each email separately to determine whether the email is suspicious. This limits the ability of email scanners to detect malicious content, because they are blind to the conversation that the email is part of and they are blind to historical relationships between the sender and the recipient.

The background description provided herein is for the purpose of presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

A computer-implemented method includes sending email scan requests to an email scanner, wherein each email scan request includes one or more emails of a plurality of emails. The method further includes receiving, from the email scanner, for each email of the plurality of emails, a verdict of suspicion and one or more data fragments, wherein the one or more data fragments for each email are generated by the email scanner based on content of the email. The method further includes storing the one or more data fragments for each email of the plurality of emails in a datastore, wherein the datastore is indexed by one or more keys that are derived from the email. The method further includes receiving a new email. The method further includes deriving one or more new keys for the new email. The method further includes retrieving one or more matching data fragments from the datastore by matching the one or more new keys with the one or more keys stored in the datastore. The method further includes providing, to the email scanner, the new email and the one or more matching data fragments. The method further includes receiving, from the email scanner, a new verdict of suspicion and one or more new data fragments.

In some embodiments, the email scanner determines the new verdict of suspicion based on content of the new email and the one or more matching data fragments. In some embodiments, the new verdict of suspicion indicates a threat level associated with the new email and the method further includes performing one or more actions on the new email, where the one or more actions are based on the threat level associated with the new email. In some embodiments, the one or more actions are selected from the group of adding a banner to the new email, blocking the new email, archiving the new email, quarantining the new email, delivering the new email to a recipient with a warning, or combinations thereof, wherein the one or more actions are selected based on the threat level associated with the new email. In some embodiments, receiving the verdict of suspicion and the one or more data fragments for each email comprises receiving a respective fragment name for each of the data fragments, wherein each fragment name is particular to a type of data fragment. In some embodiments, the one or more data fragments are selected from the group of: a unique identifier of the email scanner, a count of updates to the one or more data fragments, a feature derived from the email, an email type that indicates whether the email is inbound or outbound, and combinations thereof. In some embodiments, the method further includes storing the verdict of suspicion in an additional data fragment in the datastore. In some embodiments, each data fragment is associated with a timestamp and the method further includes: detecting one or more expired data fragments based on a difference between a respective timestamp associated with the one or more data fragments and a current timestamp, wherein a particular data fragment is determined to be expired if the difference meets a threshold difference and deleting the one or more expired data fragments from the datastore. In some embodiments, the method further includes deriving the one or more keys from the email, where the one or more keys identify one or more email fields extracted from the email, wherein the one or more email fields are selected from the group of a sender address, a recipient address, a client Internet Protocol (IP) address, a conversation identifier, a customer identifier, and combinations thereof. In some embodiments, the one or more data fragments are in a JavaScript Object Notation (JSON) format, and the datastore is a key value store or a relational database.

A device comprises one or more processors and one or more computer-readable media, having instructions stored thereon that, when executed by the one or more processors, cause the one or more processors to perform operations comprising: sending email scan requests to an email scanner, wherein each email scan request includes one or more emails of a plurality of emails; receiving, from the email scanner, for each email of the plurality of emails, a verdict of suspicion and one or more data fragments, wherein the one or more data fragments for each email are generated by the email scanner based on content of the email; storing the one or more data fragments for each email of the plurality of emails in a datastore, wherein the datastore is indexed by one or more keys that are derived from the email; receiving a new email; deriving a new key for the new email; retrieving one or more matching data fragments from the datastore by matching the new key with the keys stored in the datastore; providing, to the email scanner, the new email and the one or more matching data fragments; and receiving, from the email scanner, a new verdict of suspicion and one or more new data fragments.

In some embodiments, wherein the email scanner determines the new verdict of suspicion based on content of the new email and the one or more matching data fragments. In some embodiments, the new verdict of suspicion indicates a threat level associated with the new email, and the operations further include performing one or more actions on the new email, where the one or more actions are based on the threat level associated with the new email. In some embodiments, receiving the verdict of suspicion and the one or more data fragments for each email comprises receiving a respective fragment name for each of the data fragments, wherein each fragment name is unique for the email. In some embodiments, the one or more data fragments are selected from the group of: a unique identifier of the email scanner, a count of updates to the one or more data fragments, a feature derived from the email, an email type that indicates whether the email is inbound or outbound, and combinations thereof.

A computer-program product that includes one or more non-transitory computer-readable media with instructions stored thereon that, when executed by one or more computers, cause the one or more computers to perform operations comprising: sending email scan requests to an email scanner, wherein each email scan request includes one or more emails of a plurality of emails; receiving, from the email scanner, for each email of the plurality of emails, a verdict of suspicion and one or more data fragments, wherein the one or more data fragments for each email are generated by the email scanner based on content of the email; storing the one or more data fragments for each email of the plurality of emails in a datastore, wherein the datastore is indexed by one or more keys that are derived from the email; receiving a new email; deriving a new key for the new email; retrieving one or more matching data fragments from the datastore by matching the new key with the keys stored in the datastore; providing, to the email scanner, the new email and the one or more matching data fragments; and receiving, from the email scanner, a new verdict of suspicion and one or more new data fragments.

In some embodiments, wherein the email scanner determines the new verdict of suspicion based on content of the new email and the one or more matching data fragments. In some embodiments, the new verdict of suspicion indicates a threat level associated with the new email, and the operations further include performing one or more actions on the new email, where the one or more actions are based on the threat level associated with the new email. In some embodiments, receiving the verdict of suspicion and the one or more data fragments for each email comprises receiving a respective fragment name for each of the data fragments, wherein each fragment name is unique for the email. In some embodiments, the one or more data fragments are selected from the group of: a unique identifier of the email scanner, a count of updates to the one or more data fragments, a feature derived from the email, an email type that indicates whether the email is inbound or outbound, and combinations thereof.

The specification advantageously uses a datastore to store schemaless data fragments from emails that are retrieved and used by a scanner to provide context to aid in determining whether a new email is suspicious.

BRIEF DESCRIPTION OF THE DRAWINGS

FIG. 3 is an example data fragment, according to some embodiments described herein.

DETAILED DESCRIPTION

Network Environment 100

Figure 1:
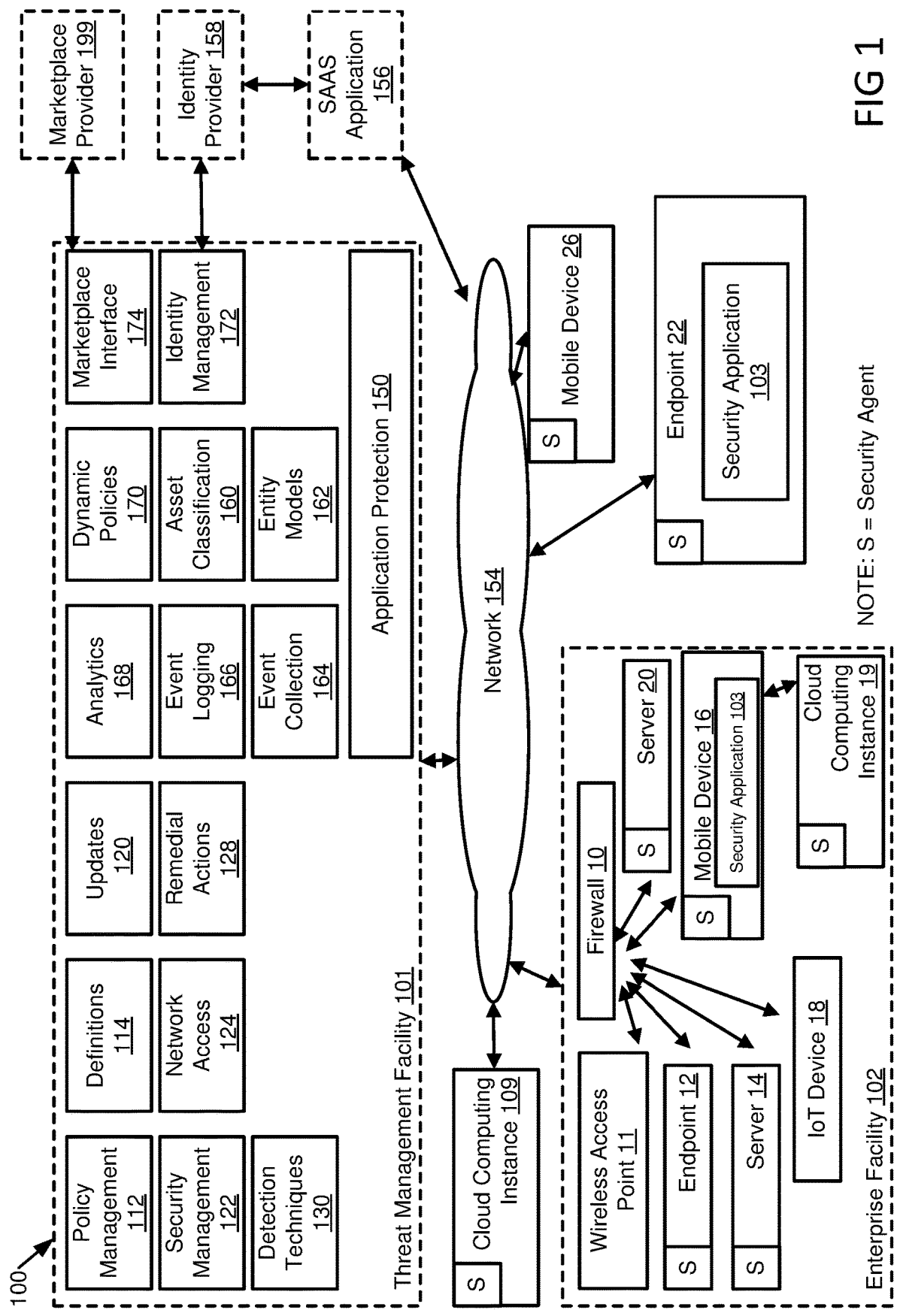
FIG. 1 is a block diagram of an example network environment, according to some embodiments described herein.

FIG. 1 depicts a block diagram of a threat management system 100 providing protection against a plurality of threats, such as malware, viruses, spyware, cryptoware, adware, ransomware, trojans, spam, intrusion, policy abuse, improper configuration, vulnerabilities, improper access, uncontrolled access, and more. A threat management facility or network monitor 100 may communicate with, coordinate, and control operation of security functionality at different control points, layers, and levels within the system 100. A number of capabilities may be provided by the threat management facility 101, with an overall goal to intelligently monitor network traffic from endpoints/hosts to known security product update sites. The threat management facility 101 can monitor the traffic passively and analyze the traffic. The threat management facility 101 may be or may include a gateway such as a web security appliance that is actively routing and/or assessing the network requests for security purposes. Another overall goal is to provide protection needed by an organization that is dynamic and able to adapt to changes in compute instances and new threats due to personal or unmanaged devices using the enterprise network. According to various aspects, the threat management facility 101 may provide protection from a variety of threats to a variety of compute instances in a variety of locations and network configurations.

As one example, users of the threat management facility 101 may define and enforce policies that control access to and use of compute instances, networks, and data. Administrators may update policies such as by designating authorized users and conditions for use and access. The threat management facility 101 may update and enforce those policies at various levels of control that are available, such as by directing compute instances to control the network traffic that is allowed to traverse firewalls and wireless access points, applications, and data available from servers, applications, and data permitted to be accessed by endpoints, and network resources and data permitted to be run and used by endpoints. The threat management facility 101 may provide many different services, and policy management may be offered as one of the services.

Turning to a description of certain capabilities and components of the threat management system 100, an example enterprise facility 102 may be or may include any networked computer-based infrastructure. For example, the enterprise facility 102 may be corporate, commercial, organizational, educational, governmental, or the like. As home networks can also include more compute instances at home and in the cloud, an enterprise facility 102 may also or instead include a personal network such as a home or a group of homes. The enterprise facility's 102 computer network may be distributed amongst a plurality of physical premises, such as buildings on a campus, and located in one or in a plurality of geographical locations. The configuration of the enterprise facility as shown as one example, and it will be understood that there may be any number of compute instances, less or more of each type of compute instances, and other types of compute instances.

As shown, the example enterprise facility includes a firewall 10, a wireless access point 11, an endpoint 12, a server 14, a mobile device 16, an appliance or Internet-of-Things (IoT) device 18, a cloud computing instance 19, and a server 20. One or more of 10-20 may be implemented in hardware (e.g., a hardware firewall, a hardware wireless access point, a hardware mobile device, a hardware IoT device, a hardware etc.) or in software (e.g., a virtual machine configured as a server or firewall or mobile device). While FIG. 1 shows various elements 10-20, these are for example only, and there may be any number or types of elements in a given enterprise facility. For example, in addition to the elements depicted in the enterprise facility 102, there may be one or more gateways, bridges, wired networks, wireless networks, virtual private networks, virtual machines or compute instances, computers, and so on.

The threat management facility 101 may include certain facilities, such as a policy management facility 112, security management facility 122, update facility 120, definitions facility 114, network access rules facility 124, remedial action facility 128, detection techniques facility 130, application protection facility 150, asset classification facility 160, entity model facility 162, event collection facility 164, event logging facility 166, analytics facility 168, dynamic policies facility 170, identity management facility 172, and marketplace management facility 174, as well as other facilities. For example, there may be a testing facility, a threat research facility, and other facilities. It should be understood that the threat management facility 101 may be implemented in whole or in part on a number of different compute instances, with some parts of the threat management facility on different compute instances in different locations. For example, some or all of one or more of the various facilities 100, 112-174 may be provided as part of a security agent S that is included in software running on a compute instance 10-26 within the enterprise facility. Some or all of one or more of the facilities 100, 112-174 may be provided on the same physical hardware or logical resource as a gateway, such as a firewall 10, or wireless access point 11. Some or all of one or more of the facilities may be provided on one or more cloud servers that are operated by the enterprise or by a security service provider, such as the cloud computing instance 109.

In various implementations, a marketplace provider 199 may make available one or more additional facilities to the enterprise facility 102 via the threat management facility 101. The marketplace provider may communicate with the threat management facility 101 via the marketplace interface facility 174 to provide additional functionality or capabilities to the threat management facility 101 and compute instances 10-26. As examples, the marketplace provider 199 may be a third-party information provider, such as a physical security event provider; the marketplace provider 199 may be a system provider, such as a human resources system provider or a fraud detection system provider; the marketplace provider may be a specialized analytics provider; and so on. The marketplace provider 199, with appropriate permissions and authorization, may receive and send events, observations, inferences, controls, convictions, policy violations, or other information to the threat management facility. For example, the marketplace provider 199 may subscribe to and receive certain events, and in response, based on the received events and other events available to the marketplace provider 199, send inferences to the marketplace interface, and in turn to the analytics facility 168, which in turn may be used by the security management facility 122. According to some implementations, the marketplace provider 199 is a trusted security vendor that can provide one or more security software products to any of the compute instances described herein. In this manner, the marketplace provider 199 may include a plurality of trusted security vendors that are used by one or more of the illustrated compute instances.

The identity provider 158 may be any remote identity management system or the like configured to communicate with an identity management facility 172, e.g., to confirm identity of a user as well as provide or receive other information about users that may be useful to protect against threats. In general, the identity provider may be any system or entity that creates, maintains, and manages identity information for principals while providing authentication services to relying party applications, e.g., within a federation or distributed network. The identity provider may, for example, offer user authentication as a service, where other applications, such as web applications, outsource the user authentication step to a trusted identity provider.

The identity provider 158 may provide user identity information, such as multi-factor authentication, to a software-as-a-service (SaaS) application. Centralized identity providers may be used by an enterprise facility instead of maintaining separate identity information for each application or group of applications, and as a centralized point for integrating multifactor authentication. The identity management facility 172 may communicate hygiene, or security risk information, to the identity provider 158. The identity management facility 172 may determine a risk score for a particular user based on events, observations, and inferences about that user and the compute instances associated with the user. If a user is perceived as risky, the identity management facility 172 can inform the identity provider 158, and the identity provider 158 may take steps to address the potential risk, such as to confirm the identity of the user, confirm that the user has approved the SaaS application access, remediate the user's system, or such other steps as may be useful.

The threat protection provided by the threat management facility 101 may extend beyond the network boundaries of the enterprise facility 102 to include clients (or client facilities) such as an endpoint 22 outside the enterprise facility 102, a mobile device 26, a cloud computing instance 109, or any other devices, services or the like that use network connectivity not directly associated with or controlled by the enterprise facility 102, such as a mobile network, a public cloud network, or a wireless network at a hotel or coffee shop. While threats may come from a variety of sources, such as from network threats, physical proximity threats, secondary location threats, the compute instances 10-26 may be protected from threats even when a compute instance 10-26 is not connected to the enterprise facility 102 network, such as when compute instances 22, 26 use a network that is outside of the enterprise facility 102 and separated from the enterprise facility 102, e.g., by a gateway, a public network, and so forth. In some implementations, the endpoint 22 and/or the mobile device 26 include a security application 103 that is discussed in greater detail below.

In some implementations, compute instances 10-26 may communicate with cloud applications, such as SaaS application 156. The SaaS application 156 may be an application that is used by but not operated by the enterprise facility 102. Example commercially available SaaS applications 156 include Salesforce, Amazon Web Services (AWS) applications, Google Apps applications, Microsoft Office 365 applications, and so on. A given SaaS application 156 may communicate with an identity provider 158 to verify user identity consistent with the requirements of the enterprise facility 102. The compute instances 10-26 may communicate with an unprotected server (not shown) such as a web site or a third-party application through an internetwork 154 such as the Internet or any other public network, private network or combination of these.

Aspects of the threat management facility 101 may be provided as a stand-alone solution. In other implementations, aspects of the threat management facility 101 may be integrated into a third-party product. An application programming interface (e.g., a source code interface) may be provided such that aspects of the threat management facility 101 may be integrated into or used by or with other applications. For instance, the threat management facility

101 may be stand-alone in that it provides direct threat protection to an enterprise or computer resource, where protection is subscribed to directly. Alternatively, the threat management facility may offer protection indirectly, through a third-party product, where an enterprise may subscribe to services through the third-party product, and threat protection to the enterprise may be provided by the threat management facility 101 through the third-party product.

The security management facility 122 may provide protection from a variety of threats by providing, as non-limiting examples, endpoint security and control, email security and control, web security and control, reputation-based filtering, machine learning classification, control of unauthorized users, control of guest and non-compliant computers, and more.

The security management facility 122 may provide malicious code protection to a compute instance. The security management facility 122 may include functionality to scan applications, files, and data for malicious code, remove or quarantine applications and files, prevent certain actions, perform remedial actions, as well as other security measures. Scanning may use any of a variety of techniques, including without limitation signatures, identities, classifiers, and other suitable scanning techniques. In some implementations, the scanning may include scanning some or all files on a periodic basis, scanning an application when the application is executed, scanning data transmitted to or from a device, scanning in response to predetermined actions or combinations of actions, and so forth. The scanning of applications, files, and data may be performed to detect known or unknown malicious code or unwanted applications. Aspects of the malicious code protection may be provided, for example, in the security agent of an endpoint 12, in a wireless access point 11 or firewall 10, as part of application protection 150 provided by the cloud, and so on.

In an implementation, the security management facility 122 may provide for email security and control, for example to target spam, viruses, spyware and phishing, to control email content, and the like. Email security and control may protect against inbound and outbound threats, protect email infrastructure, prevent data leakage, provide spam filtering, and more. Aspects of the email security and control may be provided, for example, in the security agent of an endpoint 12, in a wireless access point 11 or firewall 10, as part of application protection 150 provided by the cloud, and so on.

In an implementation, security management facility 122 may provide for web security and control, for example, to detect or block viruses, spyware, malware, unwanted applications, help control web browsing, and the like, which may provide comprehensive web access control enabling safe, productive web browsing. Web security and control may provide Internet use policies, reporting on suspect compute instances, security and content filtering, active monitoring of network traffic, uniform resource identifier (URI) filtering, and the like. Aspects of the web security and control may be provided, for example, in the security agent of an endpoint 12, in a wireless access point 11 or firewall 10, as part of application protection 150 provided by the cloud, and so on.

According to one implementation, the security management facility 122 may provide for network monitoring and access control, which generally controls access to and use of network connections, while also allowing for monitoring as described herein. Network control may stop unauthorized, guest, or non-compliant systems from accessing networks, and may control network traffic that is not otherwise controlled at the client level. In addition, network access control may control access to virtual private networks (VPN), where VPNs may, for example, include communications networks tunneled through other networks and establishing logical connections acting as virtual networks. According to various implementations, a VPN may be treated in the same manner as a physical network. Aspects of network access control may be provided, for example, in the security agent of an endpoint 12, in a wireless access point 11 or firewall 10, as part of application protection 150 provided by the cloud, e.g., from the threat management facility 101 or other network resource(s).

The security management facility 122 may also provide for host intrusion prevention through behavioral monitoring and/or runtime monitoring, which may guard against unknown threats by analyzing application behavior before or as an application runs. This may include monitoring code behavior, application programming interface calls made to libraries or to the operating system, or otherwise monitoring application activities. Monitored activities may include, for example, reading and writing to memory, reading and writing to disk, network communication, process interaction, and so on. Behavior and runtime monitoring may intervene if code is deemed to be acting in a manner that is suspicious or malicious. Aspects of behavior and runtime monitoring may be provided, for example, in the security agent of an endpoint 12, in a wireless access point 11 or firewall 10, as part of application protection 150 provided by the cloud, and so on.

The security management facility 122 may provide also for reputation filtering, which may target or identify sources of known malware. For instance, reputation filtering may include lists of URIs of known sources of malware or known suspicious internet protocol (IP) addresses, code authors, code signers, or domains, that when detected may invoke an action by the threat management facility 101. Based on reputation, potential threat sources may be blocked, quarantined, restricted, monitored, or some combination of these, before an exchange of data can be made. Aspects of reputation filtering may be provided, for example, in the security agent of an endpoint 12, in a wireless access point 11 or firewall 10, as part of application protection 150 provided by the cloud, and so on. In some implementations, some reputation information may be stored on a compute instance 10-26, and other reputation data available through cloud lookups to an application protection lookup database, such as may be provided by application protection 150.

In some implementations, information may be sent from the enterprise facility 102 to a third party, such as a security vendor, or the like, which may lead to improved performance of the threat management facility 101. In general, feedback may be useful for any aspect of threat detection. For example, the types, times, and number of virus interactions that an enterprise facility 102 experiences may provide useful information for the preventions of future virus threats. Feedback may also be associated with behaviors of individuals within the enterprise, such as being associated with most common violations of policy, network access, unauthorized application loading, unauthorized external device use, and the like. Feedback may enable the evaluation or profiling of client actions that are violations of policy that may provide a predictive model for the improvement of enterprise policies as well as detection of emerging security threats.

An update management facility 120 may provide control over when updates are performed. The updates may be automatically transmitted, manually transmitted, or some combination of these. Updates may include software, definitions, reputations or other code or data that may be useful to the various facilities. For example, the update facility 120 may manage receiving updates from a provider, distribution of updates to enterprise facility 102 networks and compute instances, or the like. In some implementations, updates may be provided to the enterprise facility's 102 network, where one or more compute instances on the enterprise facility's 102 network may distribute updates to other compute instances.

According to some implementations, network traffic associated with the update facility functions may be monitored to determine that personal devices and/or unmanaged devices are appropriately applying security updates. In this manner, even unmanaged devices may be monitored to determine that appropriate security patches, software patches, virus definitions, and other similar code portions are appropriately updated on the unmanaged devices.

The threat management facility 101 may include a policy management facility 112 that manages rules or policies for the enterprise facility 102. Example rules include access permissions associated with networks, applications, compute instances, users, content, data, and the like. The policy management facility 112 may use a database, a text file, other data store, or a combination to store policies. A policy database may include a block list, a black list, an allowed list, a white list, and more. As non-limiting examples, policies may include a list of enterprise facility 102 external network locations/applications that may or may not be accessed by compute instances, a list of types/classifications of network locations or applications that may or may not be accessed by compute instances, and contextual rules to evaluate whether the lists apply. For example, there may be a rule that does not permit access to sporting websites. When a website is requested by the client facility, a security management facility 122 may access the rules within a policy facility to determine if the requested access is related to a sporting website.

The policy management facility 112 may include access rules and policies that are distributed to maintain control of access by the compute instances 10-26 to network resources. Example policies may be defined for an enterprise facility, application type, subset of application capabilities, organization hierarchy, compute instance type, user type, network location, time of day, connection type, or any other suitable definition. Policies may be maintained through the threat management facility 101, in association with a third party, or the like. For example, a policy may restrict instant messaging (IM) activity by limiting such activity to support personnel when communicating with customers. More generally, this may allow communication for departments as necessary or helpful for department functions, but may otherwise preserve network bandwidth for other activities by restricting the use of IM to personnel that need access for a specific purpose. In one implementation, the policy management facility 112 may be a stand-alone application, may be part of the network server facility 142, may be part of the enterprise facility 102 network, may be part of the client facility, or any suitable combination of these.

The policy management facility 112 may include dynamic policies that use contextual or other information to make security decisions. As described herein, the dynamic policies facility 170 may generate policies dynamically based on observations and inferences made by the analytics facility. The dynamic policies generated by the dynamic policy facility 170 may be provided by the policy management facility 112 to the security management facility 122 for enforcement.

The threat management facility 101 may provide configuration management as an aspect of the policy management facility 112, the security management facility 122, or a combination thereof. Configuration management may define acceptable or required configurations for the compute instances 10-26, applications, operating systems, hardware, or other assets, and manage changes to these configurations. Assessment of a configuration may be made against standard configuration policies, detection of configuration changes, remediation of improper configurations, application of new configurations, and so on. An enterprise facility may have a set of standard configuration rules and policies for particular compute instances which may represent a desired state of the compute instance. For example, on a given compute instance 12, 14, 18, a version of a client firewall may be required to be running and installed. If the required version is installed but in a disabled state, the policy violation may prevent access to data or network resources. A remediation may be to enable the firewall. In another example, a configuration policy may disallow the use of uniform serial bus (USB) disks, and policy management 112 may require a configuration that turns off USB drive access via a registry key of a compute instance. Aspects of configuration management may be provided, for example, in the security agent of an endpoint 12, in a wireless access point 11 or firewall 10, as part of application protection 150 provided by the cloud, or any combination of these.

The policy management facility 112 may also require update management (e.g., as provided by the update facility 120). Update management for the security facility 122 and policy management facility 112 may be provided directly by the threat management facility 101, or, for example, by a hosted system. In some implementations, the threat management facility 101 may also provide for patch management, where a patch may be an update to an operating system, an application, a system tool, or the like, where one of the reasons for the patch is to reduce vulnerability to threats.

In some implementations, the security facility 122 and policy management facility 112 may push information to the enterprise facility 102 network and/or the compute instances 10-26, the enterprise facility 102 network and/or compute instances 10-26 may pull information from the security facility 122 and policy management facility 112, or there may be a combination of pushing and pulling of information. For example, the enterprise facility 102 network and/or compute instances 10-26 may pull update information from the security facility 122 and policy management facility 112 via the update facility 120, an update request may be based on a time period, by a certain time, by a date, on demand, or the like. In another example, the security facility 122 and policy management facility 112 may push the information to the enterprise facility's 102 network and/or compute instances 10-26 by providing notification that there are updates available for download and/or transmitting the information. In one implementation, the policy management facility 112 and the security facility 122 may work in concert with the update management facility 120 to provide information to the enterprise facility's 102 network and/or compute instances 10-26. In various implementations, policy updates, security updates, and other updates may be provided by the same or different modules, which may be the same or separate from a security agent running on one of the compute instances 10-26. Furthermore, the policy updates, security updates, and other updates may be monitored through network traffic to determine if endpoints or compute instances 10-26 correctly receive the associated updates.

As threats are identified and characterized, the definition facility 114 of the threat management facility 101 may manage definitions used to detect and remediate threats. For example, identity definitions may be used for recognizing features of known or potentially malicious code and/or known or potentially malicious network activity. Definitions also may include, for example, code or data to be used in a classifier, such as a neural network or other classifier that may be trained using machine learning. Updated code or data may be used by the classifier to classify threats. In some implementations, the threat management facility 101 and the compute instances 10-26 may be provided with new definitions periodically to include most recent threats. Updating of definitions may be managed by the update facility 120 and may be performed upon request from one of the compute instances 10-26, upon a push, or some combination. Updates may be performed at a specific a time period, on demand from a device 10-26, upon determination of an important new definition or a number of definitions, and so on.

A threat research facility (not shown) may provide a continuously ongoing effort to maintain the threat protection capabilities of the threat management facility 101 in light of continuous generation of new or evolved forms of malware. Threat research may be provided by researchers and analysts working on known threats, in the form of policies, definitions, remedial actions, and so on.

The security management facility 122 may scan an outgoing file and verify that the outgoing file is permitted to be transmitted according to policies. By checking outgoing files, the security management facility 122 may be able discover threats that were not detected on one of the compute instances 10-26, or policy violation, such transmittal of information that should not be communicated unencrypted.

The threat management facility 101 may control access to the enterprise facility 102 networks. A network access facility 124 may restrict access to certain applications, networks, files, printers, servers, databases, and so on. In addition, the network access facility 124 may restrict user access under certain conditions, such as the user's location, usage history, need-to-know data, job position, connection type, time of day, method of authentication, client-system configuration, or the like. Network access policies may be provided by the policy management facility 112, and may be developed by the enterprise facility 102, or pre-packaged by a supplier. Network access facility 124 may determine if a given compute instance 10-22 should be granted access to a requested network location, e.g., inside or outside of the enterprise facility 102. Network access facility 124 may determine if a compute instance 22, 26 such as a device outside the enterprise facility 102 may access the enterprise facility 102. For example, in some cases, the policies may require that when certain policy violations are detected, certain network access is denied. The network access facility 124 may communicate remedial actions that are necessary or helpful to bring a device back into compliance with policy as described below with respect to the remedial action facility 128. Aspects of the network access facility 124 may be provided, for example, in the security agent of the endpoint 12, in a wireless access point 11, in a firewall 10, as part of application protection 150 provided by the cloud, and so on.

In some implementations, the network access facility 124 may have access to policies that include one or more of a block list, a black list, an allowed list, a white list, an unacceptable network site database, an acceptable network site database, a network site reputation database, or the like of network access locations that may or may not be accessed by the client facility. Additionally, the network access facility 124 may use rule evaluation to parse network access requests and apply policies. The network access rule facility 124 may have a generic set of policies for all compute instances, such as denying access to certain types of websites, controlling instant messenger accesses, or the like. Rule evaluation may include regular expression rule evaluation, or other rule evaluation method(s) for interpreting the network access request and comparing the interpretation to established rules for network access. Classifiers may be used, such as neural network classifiers or other classifiers that may be trained by machine learning.

The threat management facility 101 may include an asset classification facility 160. The asset classification facility will discover the assets present in the enterprise facility 102. A compute instance such as any of the compute instances 10-26 described herein may be characterized as a stack of assets. The one level asset is an item of physical hardware. The compute instance may be, or may be implemented on physical hardware, and may have or may not have a hypervisor, or may be an asset managed by a hypervisor. The compute instance may have an operating system (e.g., Windows, MacOS, Linux, Android, iOS). The compute instance may have one or more layers of containers. The compute instance may have one or more applications, which may be native applications, e.g., for a physical asset or virtual machine, or running in containers within a computing environment on a physical asset or virtual machine, and those applications may link libraries or other code or the like, e.g., for a user interface, cryptography, communications, device drivers, mathematical or analytical functions and so forth. The stack may also interact with data. The stack may also or instead interact with users, and so users may be considered assets.

The threat management facility may include entity models 162. The entity models may be used, for example, to determine the events that are generated by assets. For example, some operating systems may provide useful information for detecting or identifying events. For examples, operating systems may provide process and usage information that are accessed through an application programming interface (API). As another example, it may be possible to instrument certain containers to monitor the activity of applications running on them. As another example, entity models for users may define roles, groups, permitted activities and other attributes.

The event collection facility 164 may be used to collect events from any of a wide variety of sensors that may provide relevant events from an asset, such as sensors on any of the compute instances 10-26, the application protection facility 150, a cloud computing instance 109 and so on. The events that may be collected may be determined by the entity models. There may be a variety of events collected. Events may include, for example, events generated by the enterprise facility 102 or the compute instances 10-26, such as by monitoring streaming data through a gateway such as firewall 10 and wireless access point 11, monitoring activity of compute instances, monitoring stored files/data on the compute instances 10-26 such as desktop computers, laptop computers, other mobile computing devices, and cloud computing instances 19, 109. Events may range in granularity. An example event may be communication of a specific packet over the network. Another example event may be identification of an application that is communicating over a network. These and other events may be used to determine that a particular endpoint includes or does not include actively updated security software from a trusted vendor.

The event logging facility 166 may be used to store events collected by the event collection facility 164. The event logging facility 166 may store collected events so that they can be accessed and analyzed by the analytics facility 168. Some events may be collected locally, and some events may be communicated to an event store in a central location or cloud facility. Events may be logged in any suitable format.

Events collected by the event logging facility 166 may be used by the analytics facility 168 to make inferences and observations about the events. These observations and inferences may be used as part of policies enforced by the security management facility 122. Observations or inferences about events may also be logged by the event logging facility 166.

When a threat or other policy violation is detected by the security management facility 122, the remedial action facility 128 may be used to remediate the threat. Remedial action may take a variety of forms, including collecting additional data about the threat, terminating or modifying an ongoing process or interaction, sending a warning to a user or administrator, downloading a data file with commands, definitions, instructions, or the like to remediate the threat, requesting additional information from the requesting device, such as the application that initiated the activity of interest, executing a program or application to remediate against a threat or violation, increasing telemetry or recording interactions for subsequent evaluation, (continuing to) block requests to a particular network location or locations, scanning a requesting application or device, quarantine of a requesting application or the device, isolation of the requesting application or the device, deployment of a sandbox, blocking access to resources, e.g., a USB port, or other remedial actions. More generally, the remedial action facility 122 may take any steps or deploy any measures suitable for addressing a detection of a threat, potential threat, policy violation or other event, code or activity that might compromise security of a computing instance 10-26 or the enterprise facility 102.

Computing Device 200

Figure 2:
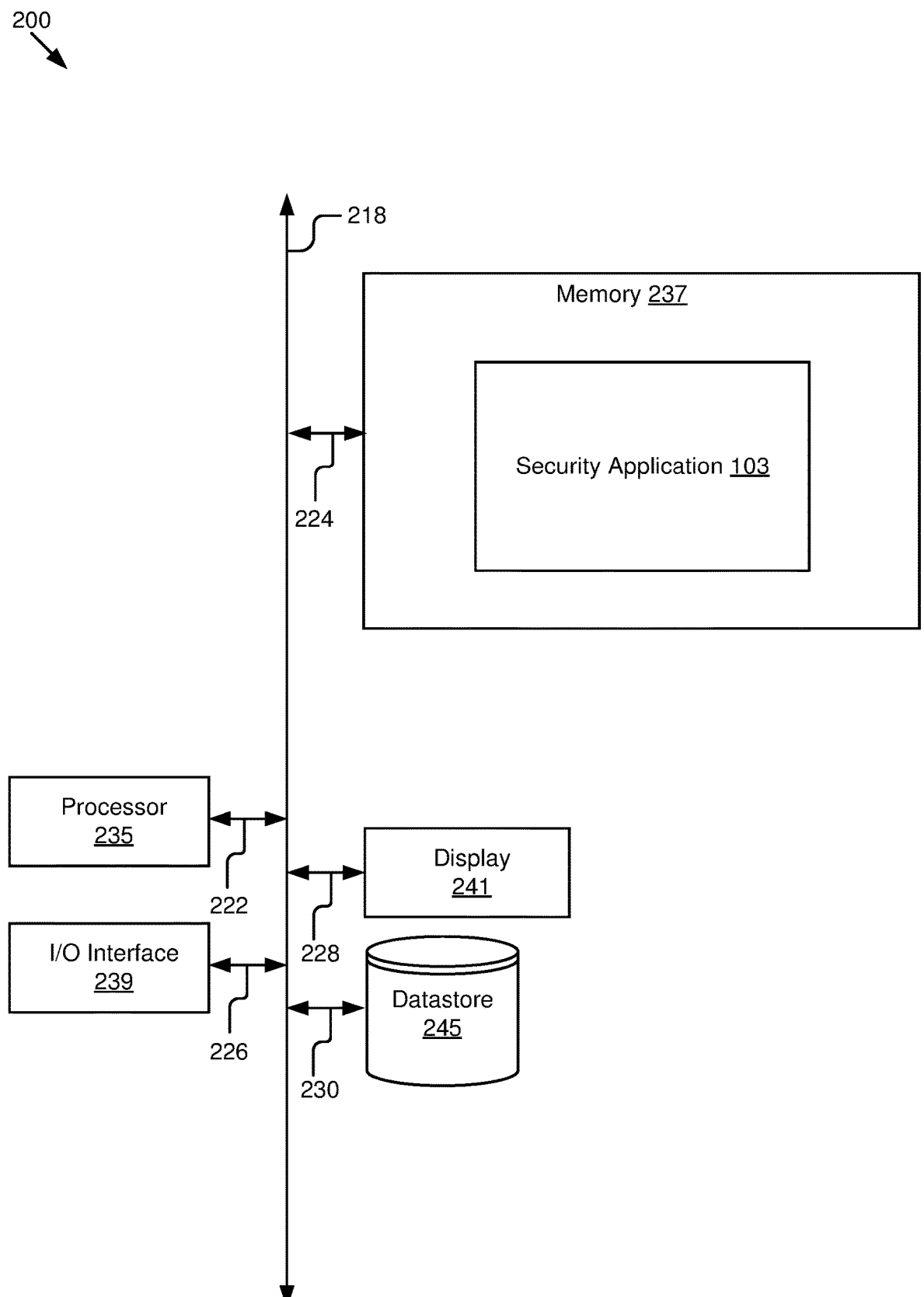
FIG. 2 is a block diagram of an example computing device, according to some embodiments described herein.

FIG. 2 is a block diagram of an example computing device 200 that may be used to implement one or more features described herein. Computing device 200 can be any suitable computer system, server, or other electronic or hardware device. In some embodiments, computing device 200 is the email server 101. In some embodiments, computing device 200 is the user device 115.

In some embodiments, computing device 200 includes a processor 235, a memory 237, an I/O interface 239, a display 241, and a datastore 245, all coupled via a bus 218.

The processor 235 includes an arithmetic logic unit, a microprocessor, a general-purpose controller, or some other processor array to perform computations and provide instructions to a display device. Processor 235 processes data and may include various computing architectures including a complex instruction set computer (CISC) architecture, a reduced instruction set computer (RISC) architecture, or an architecture implementing a combination of instruction sets. Although FIG. 2 illustrates a single processor 235, multiple processors 235 may be included. In different embodiments, processor 235 may be a single-core processor or a multicore processor. Other processors (e.g., graphics processing units), operating systems, sensors, displays, and/or physical configurations may be part of the computing device 200. The processor 235 is coupled to the bus 218 for communication with the other components via signal line 222.

The memory 237 may be a computer-readable media that stores instructions that may be executed by the processor 235 and/or data. The instructions may include code and/or routines for performing the techniques described herein. The memory 237 may be a dynamic random access memory (DRAM) device, a static RAM, or some other memory device. In some embodiments, the memory 237 also includes a non-volatile memory, such as a static random access memory (SRAM) device or flash memory, or similar permanent storage device and media including a hard disk drive, a compact disc read only memory (CD-ROM) device, a DVD-ROM device, a DVD-RAM device, a DVD-RW device, a flash memory device, or some other mass storage device for storing information on a more permanent basis. The memory 237 includes code and routines operable to execute the security application 103, which is described in greater detail below. The memory 237 is coupled to the bus 218 for communication with the other components via signal line 224.

I/O interface 239 can provide functions to enable interfacing the computing device 200 with other systems and devices. Interfaced devices can be included as part of the computing device 200 or can be separate and communicate with the computing device 200. For example, network communication devices, storage devices (e.g., memory 237 and/or datastore 245), and input/output devices can communicate via I/O interface 239. In another example, the I/O interface 239 can receive data, such as email messages, from a user device 115 and deliver the data to the security application 103. In some embodiments, the I/O interface 239 can connect to interface devices such as input devices (keyboard, pointing device, touchscreen, microphone, camera, scanner, sensors, etc.) and/or output devices (display devices, speaker devices, printers, monitors, etc.). The I/O interface 239 is coupled to the bus 218 for communication with the other components via signal line 226.

Some examples of interfaced devices that can connect to I/O interface 239 can include a display 241 that can be used to display content, e.g., an email message received from the sender. The display 241 can include any suitable display device such as a liquid crystal display (LCD), light emitting diode (LED), or plasma display screen, cathode ray tube (CRT), television, monitor, touchscreen, three-dimensional display screen, or other visual display device. The display 241 may be coupled to the bus 218 via signal line 228.

The datastore 245 may store data in any suitable format, e.g., as key value pairs in a key value store, records in a relational database, etc. The datastore 245 stores data fragments for emails received by the security application 103. The data fragments may include a unique identifier of the email scanner, a count of updates to the one or more data fragments, a feature derived from the email, an email type that indicates whether the email is inbound or outbound, information about the sender of the email (e.g., domains, internet protocol (IP) address, email address, etc.). In some embodiments, the data fragments are in a JavaScript Object Notation (JSON) format. In some embodiments, the data fragments are in binary format.

The datastore 245 is indexed by one or more keys that are derived from the emails. The datastore 245 is schemaless (with no schema), which means that the datastore 245 does not store an identity of the types of data fragments. However, because the data fragments are associated with one or more keys, the security application 103 and the email scanners use the keys to identify the different types of data fragments, such as email fields extracted from an email. In some embodiments, the keys include one or more of a sender address, a recipient address, a client IP address, a conversation identifier (ID), and/or a customer ID.

In some embodiments, the datastore 245 additionally stores a verdict of suspicion for each email. The verdict of suspicion may be stored as a data fragment. For example, the verdict of suspicion may be stored as a count of a suspicious verdict for emails and a count of emails that are not suspicious where either the count of the suspicious verdict or the count of emails that are not suspicious is increased each time the data fragments for an email are stored. Because the data fragments are indexed by keys, the count of a suspicious verdict may be associated with the sender key. For example, each time an email associated with a particular sender is determined to be suspicious, the count of the suspicious verdict for the particular sender is incremented by one.

In embodiments where the security application 103 is part of the email server 101, the datastore 245 is the same as (or stores) the datastore 199 in FIG. 1. The datastore 245 may be coupled to the bus 218 via signal line 230.

In some embodiments, one or more components of the computing device 200 may not be present depending on the type of computing device 200. For example, if the computing device 200 is an email server 101, the computing device 200 may not include the display 241.

Example Security Application 103

FIG. 2 illustrates a computing device 200 that executes an example security application 103 stored on the memory 237. The security application 103 may send email scan requests to an email scanner. For example, the security application 103 may receive an email and provide the email to the email scanner along with the request.

The email scanner processes the request and provides the security application 103 with, for each email, a verdict of suspicion and one or more data fragments. The email scanner generates the data fragments based on content of the email. For example, the data fragments include a feature derived from the email, a count of updates to the one or more data fragments, and/or an email type that indicates whether the email is inbound or outbound. The data fragments may also include the verdict of suspicion. In some embodiments, the data fragments include a unique identifier of the email scanner and information derived from the email scanner. For example, the data fragments may relate to spam detection and/or spoofed sender detection. The email scanner may also generate the data fragments based on data fragments that are part of the email scan requests.

Turning to FIG. 3, an example data fragment 300 is illustrated. Top-level attributes for the data fragment are illustrated. The example includes the fragments of data, the identification of a key (e.g., the sender's address), an identification of the scanner (e.g., Sophos anti-spam interface), an arbitrary (or predetermined) name chosen by the scanner (e.g., inbound-sender-seen), and a count that is incremented when the fragment data is changed (e.g., a count of emails that the scanner determined were suspicious). The name of data fragments may be used to differentiate the data fragments by purpose. In this example, the name of the data fragment is inbound-sender-seen, which references the email being an inbound email as opposed to an outbound email.

The security application 103 stores the data fragments for each email in the datastore 245. The datastore 245 is indexed by one or more keys that are derived from the email. For example, the keys include a sender address, a recipient address, a client Internet Protocol (IP) address, a conversation identifier, and/or a customer identifier. In various embodiments, the keys may be derived from metadata, header information, body of the email, or a combination. In some embodiments, the security application 103 uses a compound key, which identifies two or more attributes with a single key. For example, the compound key may be used to maintain a per customer state for each external sender. Examples of the per customer state include how many emails are received from a particular domain and sent to a customer, how many email conversations have been initiated with a specific recipient by a customer, whether the sender previously initiated an email to a customer, whether a customer typically initiates email conversations in Japanese, etc.

When the security application 103 receives a new email, the security application 103 derives one or more keys for the new email and retrieves one or more matching data fragments from the datastore 245 by matching the one or more new keys with the one or more keys stored in the datastore 245.

The security application 103 provides the new email and the one or more matching data fragments to the email scanner to provide the email scanner with additional context for rendering a new verdict of suspicion for the new email. For example, the matching data fragments may include a count of a verdict of suspicion and/or a count of emails that are not suspicious that are associated with the same sender as the new email. If the new email was sent by a sender that sends emails that are determined to be suspicious 90% of the time (e.g., 90% of prior messages from the sender received a positive verdict of suspicion), the email scanner is likely to determine that the new email is similarly suspicious. In another example, the new email may include a recipient that has been targeted for suspicious emails, as indicated by a data fragment that counts a number of prior suspicious emails sent to the recipient. In yet another example, the count may be used to implement simple service features, such as when the security application 103 determines that a count of 0, which indicates that the sender has not previously sent an email to a particular recipient or any recipient, results in the security application 103 applying a banner to the new email.

The security application 103 receives, from the email scanner, a new verdict of suspicion and one or more new data fragments. The new data fragments are extracted by the email scanner from the new email. The email scanner determines the new verdict of suspicion based on the content of the new email and the one or more matching data fragments.

In some embodiments, the new verdict of suspicion indicates a threat level associated with the new email. The security application 103 may perform one or more actions on the new email based on the threat level associated with the new email. For example, if the threat level is low or medium, the security application 103 may add a banner to the new email and/or deliver the new email to the recipient with a warning. The banner may include a warning that identifies the new email as potentially suspicious. The banner may include a reason why the new email is potentially suspicious, e.g., "unknown sender," "sender domain not verified," "person X usually sends email from address Y, but this message is from address Z," etc.

In another example, if the new email is associated with a medium threat level, the security application 103 may quarantine the new email (not deliver the email to the user's email inbox, further inspect the email, provide the email to an administrator for manual review, etc.) or archive the new email (e.g., send the email to a spam folder, archive without delivery, etc.). In yet another example, if the new email is associated with a high threat level, the security application 103 may block the new email and prevent it from being delivered.

In some embodiments, the security application 103 performs the removal of data fragments that are older than a defined age to limit the volume of stored data. Each data fragment may be associated with a timestamp and the security application 103 may detect one or more expired data fragments based on a difference between a respective timestamp associated with the one or more data fragments and a current timestamp, wherein a particular data fragment is determined to be expired if the difference meets a threshold difference. The security application 103 may delete the one or more expired data fragments from the datastore 245.

In some embodiments, the security application 103 generates graphical data (e.g., a graphical user interface) that is displayed by the display 241. The user interface may be displayed on the computing device 200 as part of the security application 103, as a website, or as another graphical interface, and may generally provide an interface for user interaction with the security application 103, for email message management, warnings of suspicious content, network administration, audit, configuration and so forth. The user interface may facilitate action on potential threats, e.g., by presenting threats along with other supplemental information, and providing controls for a user to dispose of such threats as desired, e.g., by permitting execution or access, by denying execution or access, or by engaging in remedial measures such as sandboxing, quarantining, vaccinating, and so forth.

In some embodiments, the security application 103 generates a user interface that includes the email message. The user interface may include an option to report the email as suspicious. For example, the user interface may include a button or link that is user selectable for reporting etc.

In some embodiments, where the security application 103 performs one or more actions on the new email, the security application 103 may generate a user interface based on the one or more actions. For example, the user interface may include a warning about the email and an option to ignore the alert and provide the email to the recipient.

In some embodiments, the security application 103 generates a user interface that an administrator can use to modify settings of the security application 103. For example, the user interface may include an option for configuring how email messages are treated when the email message is associated with a verdict of suspicion and/or a particular threat level.

Figure 4:
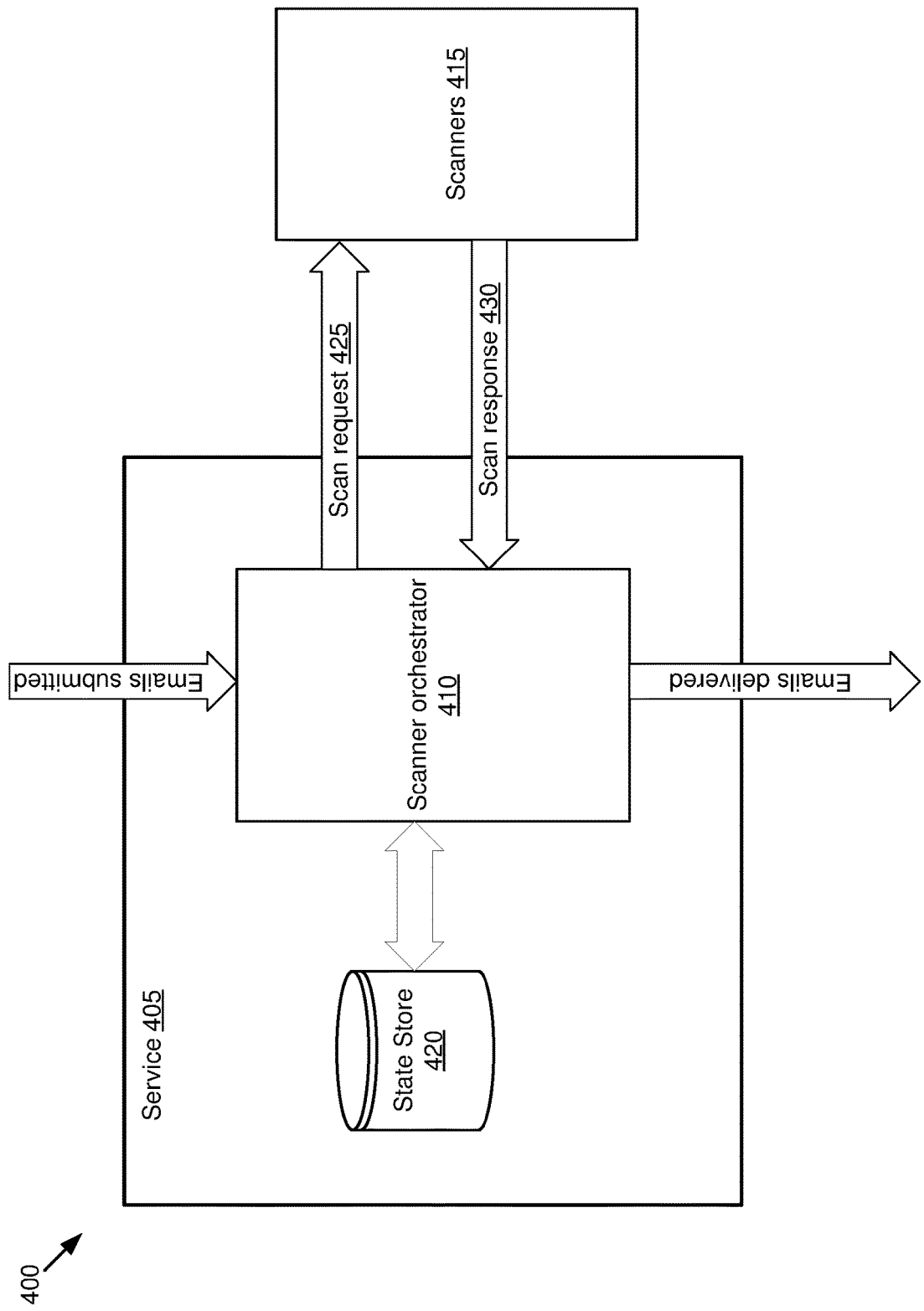
FIG. 4 is an example block diagram that illustrates the transmission of data between a scanner orchestration, scanners, and a state store, according to some embodiments described herein.

Turning to FIG. 4, an example block diagram 400 illustrates the transmission of data between a scanner orchestrator 410 which is part of a service 405, one or more scanners 415, and a state store 420. Emails (e.g., incoming emails that are not yet delivered to a user's inbox) are submitted to the scanner orchestrator 410, which processes each email by submitting it in turn to a sequence of scanners 415. For example, the scanner orchestrator 410 may post a reference to the email in a message queue for each scanner 415. In addition, the scanner orchestrator 410 determines state keys for the email (e.g., sender, client IP, recipient, etc.).

The scanner orchestrator 410 obtains data fragments from the state store 420 and includes the data fragments in a scan request 425 that is provided to the scanners 415. A data fragment is identified by its key and by the data fragment's name, which acts as a namespace. The data fragment's name may be usable to separate feature state, inbound versus outbound emails, etc. The data fragments may also be associated with an expiration date.

The data fragments are schemaless opaque JSON that are simply passed through by the scanner orchestrator 410. The scanner orchestrator 410 passes data fragments between a scanner 415 and a state store 420 without processing or analyzing the data fragments. The schemaless nature of the data fragments enables each scanner 415 to define its own format (e.g., content of the data fragment, metadata of the data fragment, keys for the data fragment, etc.) independent of other scanners 415 as well as the scanner orchestrator 410. This enables isolation of different scanners 415 from each other, enabling each to utilize the state store 420. Isolating the scanners 415 advantageously allows for separation of concerns so that the scanners 415 are independent of one another and avoids the risk of one scanner being upset by the presence of additional data relating to a different scanner 415.

The scanner 415 parses the data fragments that it recognizes and ignores the data fragments that it does not recognize. The scanner 415 provides the data fragments to the scanner orchestrator 410.

The scanner 415 also provides a verdict for each email, such as a verdict of suspicious for a suspicious email. For example, the verdict may be part of scan response 430. The scanner 415 may return an empty state fragment to remove any existing corresponding fragment from the state store 420. If the verdict is not for a suspicious email, the scanner orchestrator 410 delivers the emails to their intended recipients.

The state store 420 stores the arbitrary JSON data fragments that are indexed by keys. The scanner orchestrator 410 uses the keys to retrieve the data fragments from the state store 420. Multiple named fragments may be associated with each key and a request may result in retrieving multiple data fragments.

In some embodiments, the scanner orchestrator 410 requests data fragments from the state store 420 that match the data fragments in an email. For example, the scanner orchestrator 410 may use keys for a sender to retrieve information about data fragments related to a particular sender. The scanner orchestrator 410 provides the matching data fragments to the scanners 415 for the scanners 415 to use as additional input in reaching their verdicts.

Continuing with the architecture illustrated in FIG. 4, a simple example uses data fragments to determine whether a sender email address has been seen in the last three months because a new email address is less likely to be trustworthy. The scanner 415 generates an output data fragment containing a single flag—the sender address has been seen. The scanner orchestrator 410 keys the data fragment by sender address. When the scanner orchestrator 410 processes a new email from the same sender, the scanner orchestrator 410 retrieves the data fragment as part of the scanner request and a scanner 415 takes the data fragment into account when determining its verdicts.

As a result, the scanner 415 advantageously refines its detection at short notice, by adding more details to the data fragments, such as different time spans, counts of emails seen, details specific to the customer rather than more general information, etc. The data fragments can become increasingly complex. For example, the data fragments can be partitioned by features by using the data fragment name as a namespace to avoid unwanted coupling between rules or features, to separate inbound emails and outbound emails, etc. Once the email scanning is complete, the scanner orchestrator 410 (or in some embodiments, the scanner 415) determines whether emails should be delivered to an email application or directly to a user, e.g., emails with a negative verdict of suspicion may be delivered as is, while emails with a positive verdict of suspicion may be delivered with a warning message, may be quarantined, or may be blocked from delivery. In some embodiments, the verdict of suspicion includes a threat level associated with the email that may be used by the scanner orchestrator 410 to determine a type of action, such as adding a banner to the email, quarantining the email, blocking the email, etc.

Example Method 500

Figure 5:
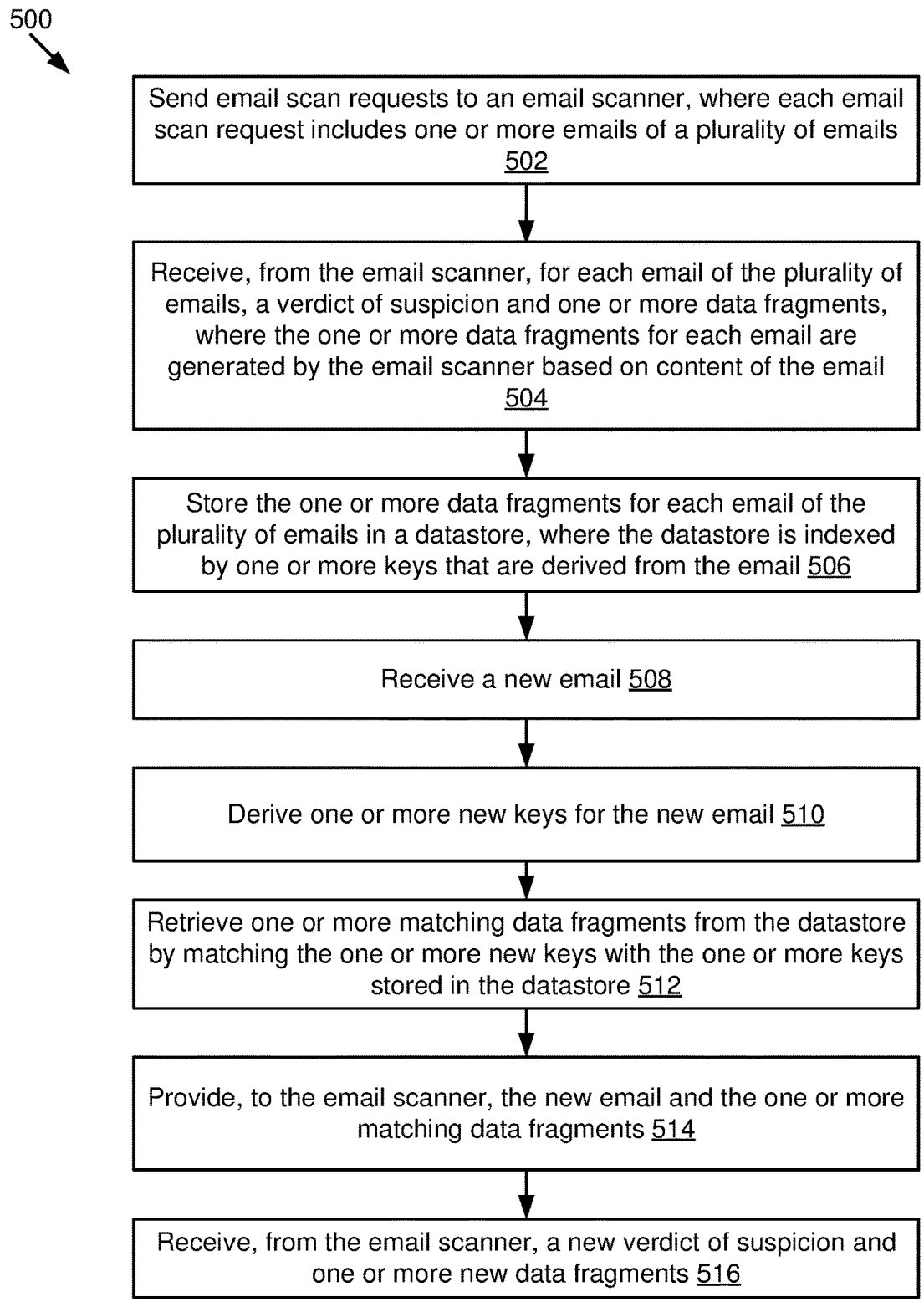
FIG. 5 is a flow diagram of an example method to determine whether an email is suspicious, according to some embodiments described herein.

FIG. 5 is a flow diagram of an example method 500 to determine whether an email is suspicious. The method 500 may be performed by a computing device 200 where the computing device 200 is user device 115, an email server 101, or in part a user device 115 and in part an email server 101.

The method 500 may begin at block 502. At block 502, email scan requests are sent to an email scanner, where each email scan request includes one or more emails of a plurality of emails. Block 502 may be followed by block 504.

At block 504, the email scanner provides, for each email of the plurality of emails, a verdict of suspicion and one or more data fragments, where the one or more data fragments for each email are generated by the email scanner based on content of the email. The data fragments may be in a JSON format. The data fragments may include a unique identifier of the email scanner, a count of updates to the one or more data fragments, a feature derived from the email, and/or an email type that indicates whether the email is inbound or outbound. Block 504 may be followed by block 506.

At block 506, the one or more data fragments for each email of the plurality of emails are stored in a datastore, where the datastore is indexed by one or more keys that are derived from the email. The datastore may be a key value store or a relational database. The datastore may also store the verdict of suspicion in an additional data fragment. The one or more keys may be derived from the email, where the one or more keys identify one or more email fields extracted from the emails, and the one or more email fields include a sender address, a recipient address, a client Internet Protocol (IP) address, a conversation identifier, and/or a customer identifier. Block 506 may be followed by block 508.

At block 508 a new email is received. Block 508 may be followed by block 510.

At block 510, one or more new keys are derived for the new email. Block 510 may be followed by block 512.

At block 512, one or more matching data fragments are retrieved from the datastore by matching the one or more new keys with the one or more keys stored in the database. Block 512 may be followed by block 514.

At block 514, the email scanner is provided with the new email and the one or more matching data fragments. Receiving the data fragments may include receiving a respective fragment name for each of the data fragments, where each fragment name is particular to a type of data fragment. For example, the fragment name may indicate that the email is from an inbound sender as illustrated in the example in FIG. 3. Block 514 may be followed by block 516.

At block 516, the email scanner provides a new verdict of suspicion and one or more new data fragments. The email scanner may determine the new verdict of suspicion based on content of the new email and the one or more matching data fragments.

The new verdict of suspicion may indicate a threat level associated with the new email. In some embodiments, one or more actions may be performed on the new email based on the threat level associated with the new email. For example, the one or more actions may include adding a banner to the new email, blocking the new email, archiving the new email, quarantining the new email, and/or delivering the new email to a recipient with a warning.

In some embodiments, each data fragment is associated with a timestamp. One or more expired data fragments may be detected based on a difference between a respective timestamp associated with the one or more data fragments and a current timestamp, wherein a particular data fragment is determined to be expired if the difference meets a threshold difference. The one or more expired data fragments may be deleted from the datastore.

Various embodiments described herein perform automated computer-based analysis of email messages, including message content and metadata. Such automated analysis is performed with explicit user permission, in compliance with applicable laws and regulations. No content is shared with a third-party or reviewed by a human, other than those authorized by users. For example, the described techniques may be implemented in a security platform that performs automated scanning and threat mitigation. The security platform is configurable and may include various privacy settings. The security platform may be implemented by an email recipient organization, such as an organization (company, university, non-profit, government, etc.) and/or an email service provider. Email messages and/or features extracted from email messages may be stored and utilized in accordance with user-permitted settings.

In the above description, for purposes of explanation, numerous specific details are set forth in order to provide a thorough understanding of the specification. It will be apparent, however, to one skilled in the art that the disclosure can be practiced without these specific details. In some instances, structures and devices are shown in block diagram form in order to avoid obscuring the description. For example, the embodiments can be described above primarily with reference to user interfaces and particular hardware. However, the embodiments can apply to any type of computing device that can receive data and commands, and any peripheral devices providing services.

Reference in the specification to "some embodiments" or "some instances" means that a particular feature, structure, or characteristic described in connection with the embodiments or instances can be included in at least one implementation of the description. The appearances of the phrase "in some embodiments" in various places in the specification are not necessarily all referring to the same embodiments.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic data capable of being stored, transferred, combined, compared, and otherwise manipulated. It has proven convenient at times, principally for reasons of common usage, to refer to these data as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms including "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission, or display devices.

The embodiments of the specification can also relate to a processor for performing one or more steps of the methods described above. The processor may be a special-purpose processor selectively activated or reconfigured by a computer program stored in the computer. Such a computer program may be stored in a non-transitory computer-readable storage medium, including, but not limited to, any type of disk including optical disks, ROMs, CD-ROMs, magnetic disks, RAMS, EPROMs, EEPROMs, magnetic or optical cards, flash memories including USB keys with non-volatile memory, or any type of media suitable for storing electronic instructions, each coupled to a computer system bus.

The specification can take the form of some entirely hardware embodiments, some entirely software embodiments or some embodiments containing both hardware and software elements. In some embodiments, the specification is implemented in software, which includes, but is not limited to, firmware, resident software, microcode, etc.

Furthermore, the description can take the form of a computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

A data processing system suitable for storing or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

What is claimed is:

1. A computer-implemented method comprising:
   sending email scan requests to an email scanner, wherein each email scan request includes one or more emails of a plurality of emails;
   receiving, from the email scanner, for each email of the plurality of emails, a verdict of suspicion and one or more data fragments, the one or more data fragments each including a count, wherein the one or more data fragments for each email are generated by the email scanner based on content of the email;
   storing the one or more data fragments for each email of the plurality of emails in a datastore, wherein the datastore is indexed by one or more keys that are derived from the email and wherein one or more respective counts for the one or more data fragments are incremented responsive to receiving the verdict of suspicion;
   receiving a new email;
   deriving one or more new keys for the new email;
   retrieving one or more matching data fragments from the datastore by matching the one or more new keys with the one or more keys stored in the datastore;
   providing, to the email scanner, the new email, the one or more matching data fragments, and the one or more respective counts for the one or more matching data fragments; and
   receiving, from the email scanner, a new verdict of suspicion and one or more new data fragments, wherein the new verdict of suspicion is based on the one or more respective counts for the one or more matching data fragments.

2. The computer-implemented method of claim 1, wherein the email scanner further determines the new verdict of suspicion based on content of the new email and the one or more matching data fragments.

3. The computer-implemented method of claim 1, wherein the new verdict of suspicion indicates a threat level associated with the new email, and further comprising:
   performing one or more actions on the new email, where the one or more actions are based on the threat level associated with the new email.

4. The computer-implemented method of claim 3, wherein the one or more actions are selected from the group of adding a banner to the new email, blocking the new email, archiving the new email, quarantining the new email, delivering the new email to a recipient with a warning, or combinations thereof, wherein the one or more actions are selected based on the threat level associated with the new email.

5. The computer-implemented method of claim 1, wherein receiving the verdict of suspicion and the one or more data fragments for each email comprises receiving a respective fragment name for each of the data fragments, wherein each fragment name is particular to a type of data fragment.

6. The computer-implemented method of claim 1, wherein the one or more data fragments further include features that are selected from the group of: a unique identifier of the email scanner, a feature derived from the email, an email type that indicates whether the email is inbound or outbound, and combinations thereof.

7. The computer-implemented method of claim 1, further comprising storing a count of the verdict of suspicion as in an additional data fragment in the datastore.

8. The computer-implemented method of claim 1, wherein each data fragment is associated with a timestamp, the method further comprising:
   detecting one or more expired data fragments based on a difference between a respective timestamp associated with the one or more data fragments and a current timestamp, wherein a particular data fragment is determined to be expired if the difference meets a threshold difference; and
   deleting the one or more expired data fragments from the datastore.

9. The computer-implemented method of claim 1, further comprising deriving the one or more keys from the email, wherein the one or more keys identify one or more email fields extracted from the email, wherein the one or more email fields are selected from the group of a sender address, a recipient address, a client Internet Protocol (IP) address, a conversation identifier, a customer identifier, and combinations thereof.

10. The computer-implemented method of claim 1, wherein the one or more data fragments are in a JavaScript Object Notation (JSON) format, and wherein the datastore is a key value store or a relational database.

11. A device comprising:
one or more processors; and
one or more computer-readable media, having instructions stored thereon that, when executed by the one or more processors, cause the one or more processors to perform operations comprising:
sending email scan requests to an email scanner, wherein each email scan request includes one or more emails of a plurality of emails;
receiving, from the email scanner, for each email of the plurality of emails, a verdict of suspicion and one or more data fragments, the one or more data fragments each including a count, wherein the one or more data fragments for each email are generated by the email scanner based on content of the email;
storing the one or more data fragments for each email of the plurality of emails in a datastore, wherein the datastore is indexed by one or more keys that are derived from the email and wherein one or more respective counts for the one or more data fragments are incremented responsive to receiving the verdict of suspicion;
receiving a new email;
deriving a new key for the new email;
retrieving one or more matching data fragments from the datastore by matching the new key with the keys stored in the datastore;
providing, to the email scanner, the new email, the one or more matching data fragments, and the one or more respective counts for the one or more matching data fragments; and
receiving, from the email scanner, a new verdict of suspicion and one or more new data fragments, wherein the new verdict of suspicion is based on the one or more respective counts for the one or more matching data fragments.

12. The device of claim 11, wherein the email scanner further determines the new verdict of suspicion based on content of the new email and the one or more matching data fragments.

13. The device of claim 11, wherein the new verdict of suspicion indicates a threat level associated with the new email, and the operations further comprise:
performing one or more actions on the new email, where the one or more actions are based on the threat level associated with the new email.

14. The device of claim 11, wherein receiving the verdict of suspicion and the one or more data fragments for each email comprises receiving a respective fragment name for each of the data fragments, wherein each fragment name is unique for the email.

15. The device of claim 11, wherein the one or more data fragments further include features that are selected from the group of: a unique identifier of the email scanner, a feature derived from the email, an email type that indicates whether the email is inbound or outbound, and combinations thereof.

16. A computer-program product that includes one or more non-transitory computer-readable media with instructions stored thereon that, when executed by one or more computers, cause the one or more computers to perform operations comprising:
sending email scan requests to an email scanner, wherein each email scan request includes one or more emails of a plurality of emails;
receiving, from the email scanner, for each email of the plurality of emails, a verdict of suspicion and one or more data fragments, the one or more data fragments each including a count, wherein the one or more data fragments for each email are generated by the email scanner based on content of the email;
storing the one or more data fragments for each email of the plurality of emails in a datastore, wherein the datastore is indexed by one or more keys that are derived from the email and wherein one or more respective counts for the one or more data fragments are incremented responsive to receiving the verdict of suspicion;
receiving a new email;
deriving one or more new keys for the new email;
retrieving one or more matching data fragments from the datastore by matching the one or more new keys with the one or more keys stored in the datastore;
providing, to the email scanner, the new email, the one or more matching data fragments, and the one or more respective counts for the one or more matching data fragments; and
receiving, from the email scanner, a new verdict of suspicion and one or more new data fragments, wherein the new verdict of suspicion is based on the one or more respective counts for the one or more matching data fragments.

17. The computer-program product of claim 16, wherein the email scanner further determines the new verdict of suspicion based on content of the new email and the one or more matching data fragments.

18. The computer-program product of claim 16, wherein the new verdict of suspicion indicates a threat level associated with the new email, and the operations further comprise:
performing one or more actions on the new email, where the one or more actions are based on the threat level associated with the new email.

19. The computer-program product of claim 16, wherein receiving the verdict of suspicion and the one or more data fragments for each email comprises receiving a respective fragment name for each of the data fragments, wherein each fragment name is unique for the email.

20. The computer-program product of claim 16, wherein the one or more data fragments further include features that are selected from the group of: a unique identifier of the email scanner, a feature derived from the email, an email type that indicates whether the email is inbound or outbound, and combinations thereof.

* * * * *